United States Patent [19]

Mattimoe

[11] 4,302,503

[45] Nov. 24, 1981

[54] ARCHITECTURAL SPANDREL

[75] Inventor: Paul T. Mattimoe, Toledo, Ohio

[73] Assignee: Libbey-Owens-Ford Company, Toledo, Ohio

[21] Appl. No.: 906,834

[22] Filed: May 17, 1978

[51] Int. Cl.³ .......................... B32B 5/16; B32B 7/00; B32B 15/16; B32B 17/06
[52] U.S. Cl. .................................. 428/323; 428/333; 428/334; 428/432; 428/433
[58] Field of Search .................. 428/34, 38, 432, 433, 428/434, 323, 333, 334; 52/812, 786, 612, 235

[56] References Cited

U.S. PATENT DOCUMENTS

| | | | |
|---|---|---|---|
| 3,069,301 | 12/1962 | Buckley et al. | 428/434 |
| 3,290,203 | 12/1966 | Antonson et al. | 428/432 |
| 4,016,324 | 4/1977 | Cooke et al. | 428/434 |

*Primary Examiner*—William J. Van Balen
*Attorney, Agent, or Firm*—Collins, Oberlin & Darr

[57] ABSTRACT

A glass spandrel coated on the inwardly glazed glass surface with a transparent heat reflective film and a black, opaque coating firmly adhered to and covering the exposed surface of the film. The opaque coating includes a light absorbing component to limit the visible light reflection from materials attached to or located behind the inwardly glazed coated surface below a critical value.

9 Claims, 3 Drawing Figures

ARCHITECTURAL SPANDREL

This invention relates to architectural panels and more particularly to reflective glass spandrels for use in glazing the exterior walls of buildings, for example, for glazing or installation in the areas of curtain wall construction other than the vision areas.

A spandrel, as the term is used herein, refers to a panel including a glass sheet which is rendered substantially opaque by a reflective coating and/or backing material applied thereto. Such spandrels are employed for the most part to conceal those portions of a building that would not be aesthetically pleasing if capable of view from the exterior of the building, e.g., floor slabs, heating and air conditioning ducts, plumbing and electrical piping and conduits, etc. Often the spandrels include a slab of insulating material affixed to the coated glass sheet by means of a suitable adhesive.

In the past, ceramic enamels, for example, lead borosilicate glass frit enamels, have been employed to produce opaque coatings on glass spandrels. However, with the development of highly heat and light reflective transparent metal and/or metal oxide coatings, it has become desirable to develop spandrel panels which would match or harmonize with the coated glass vision panels to be glazed adjacent to the spandrels. The best match would, of course, occur if the same film composition were used on the spandrel as on the vision panel. However, in producing insulated spandrels, it was found that the adhesive used to affix the insulation to the coated glass panel would show through the panel when it was installed. It was recognized that this problem resulted from the fact that the spandrel film, matching as it does the vision area film, transmits some light.

An attempt was made to solve the above problem by using an opaque coating applied over the heat reflective metal and/or metal oxide film on the glass surface to which the adhesive was applied. This coating, not being transparent to light, did screen out the adhesive but it was found that it simultaneously gave a hazy look to the spandrel unit.

It has now been discovered, and the instant invention is based upon such discovery, that if a coating black in color and containing a light absorbing material which will absorb substantially all the incident light, is applied over the metal and/or metal oxide film on the spandrel glass, the resulting panel does not exhibit an outwardly appearing hazy look and provides an extremely good match with adjacent filmed vision areas. It is suspected that the reason for the improved appearance is due to the fact that the light which passes through the metal oxide coating is nearly completely absorbed and therefore is not partially reflected back through the film and glass again.

It is accordingly an object of the invention to provide an improved architectural spandrel.

Another object of the invention is the provision of a vitreous building spandrel having applied to its inwardly facing surface a layer of insulating material, which spandrel aesthetically complements adjacent vision areas.

Other objects and advantages of the invention will become more apparent during the course of the following description when taken in connection with the accompanying drawings.

In the drawings, wherein like numerals are employed to designate like parts throughout the same:

Generally stated, the present invention provides an architectural spandrel comprising a transparent substrate, a transparent reflective coating disposed on a major surface of said substrate, an opaque black coating disposed over said transparent coating and including a light absorbing component which absorbs substantially all of the incident light, an adhesive applied to the opaque coating, and a layer of insulating material adhered to the adhesive.

Figure 1:
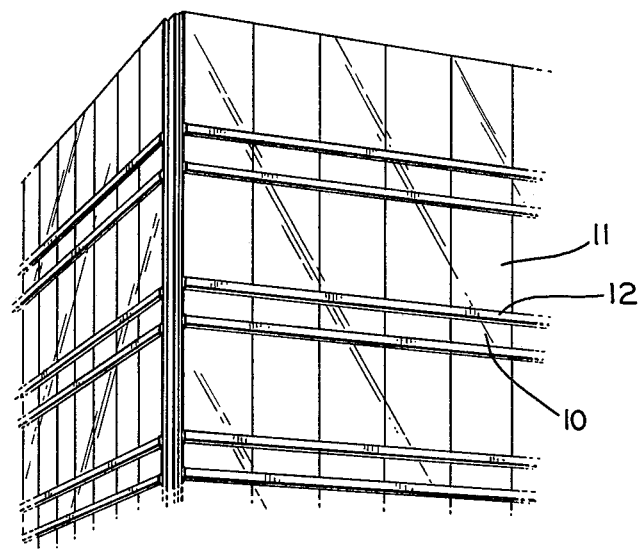
FIG. 1 is a fragmentary perspective view of a building employing spandrels in accordance with the invention.
Figure 2:
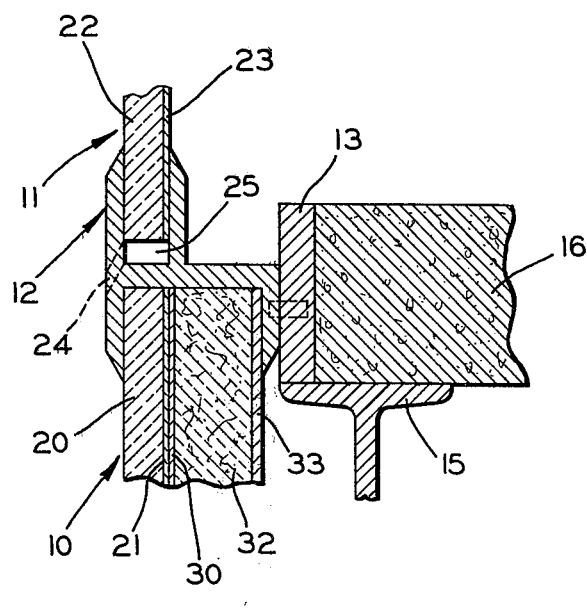
FIG. 2 is a schematic view, partially in section and partially in elevation, of a portion of the curtain wall construction shown in FIG. 1.

Referring now more particularly to the drawings, the curtain wall construction shown generally in FIG. 1 includes spandrels 10 and vision area glazings 11 mounted in frame members 12. Each frame member is connected to a mounting 13 (FIG. 2) which is supported on a structural member 15. A floor 16, which is mounted on the structural member 15, faces the wall areas of the frame 12 and spandrel 10 so that the edge of the floor, the structural member, the mounting and any material below floor level and above the next lower ceiling are hidden from exterior view by the spandrel and the frame.

The spandrel 10 comprises a transparent refractory substrate 20 which in the majority of instances is glass, for example float glass. Clear or tinted glasses such as gray or bronze heat-absorbing glass, may be employed. It is preferred that the glass 20 be heat strengthened or tempered to obtain the properties concomitant with such treatment. Disposed on the interior, inwardly facing surface of the substrate is a transparent reflective coating 21.

The vision area glazing 11 comprises a transparent substrate 22 which is preferably glass, and of similar composition to the spandrel glass. Disposed on the interior, inwardly facing surface of the substrate 22 is a transparent reflective coating 23. As in conventional glazing, the frame is provided with weep holes 24 and a drain space 25.

Coating 23 of the vision glazing and coating 21 of the spandrel are substantially identical. In this respect, the coating 23 is chosen to provide particular optical properties, i.e., selective reflectances and transmittances, over an extended spectral range. Examples of such coatings are 20 to 1000 Angstroms thick films of metals such as copper, chromium, nickel, tin, iron, cobalt, silver and gold, or the oxides thereof, or various mixtures of such metals and oxides. These coatings may be applied by vacuum deposition, sputtering, chemical vapor deposition, thermal decomposition or pyrolysis of liquid spray solutions, all as are well known in the art. Some typical properties of these films when applied to nominal 0.25 inch thick clear glass are 6 percent to 44 percent reflectance of incident visible light (average daylight reflectance), 5 percent to 35 percent total solar reflectance, and luminous transmittances of 5 percent to 35 percent. Reflectances given above are from the glass surface of the filmed sheet. It should be noted that transparent, as used herein, indicates luminous transmittances of at least about 5 percent, while opaque, as used herein, indicates luminous transmittances of less than 0.1 percent.

A black opaque coating 30 is disposed over the transparent coating 21. The coating 30 is generally in the nature of 0.1 to 5 mils thick and composed of a paint having a black pigment intimately and homogeneously dispersed therein. Excellent results have been obtained with the use of carbon black dispersed in an alkyd based lacquer. The carbon black is in the form of millimicron-sized particles and should be present in an amount sufficient to render the coating absorbing to all incident light. Put in different parameters, the paint coating in accordance with the invention must be black, preferaby gloss black, must be opaque, and, when applied to a clear glass sheet, should show an Illuminant C diffuse reflectance from the glass side of not more than 0.3 percent and preferably in the range of 0.05 to 0.2 percent, with optimum results being obtained with reflectances less than 0.15 percent.

In addition to carbon black, various other black light absorbing pigments may be employed in accordance with the invention, among which may be mentioned ferroso-ferric oxide (magnetite or black magnetic iron oxide). Further, in addition to alkyd based lacquers, paints based on phenolic modified pentaerythritols, polyurethanes, epoxies and acrylics may be employed.

After the opaque coating 30 has been applied and allowed to dry, an adhesive 31 is applied to the exposed surface of the coating 30. Any adhesive material effective to tightly bond the insulating layer or mat to the glass and coatings thereon may be used and it may be applied either at a series of spaced points as shown or as a continuous layer over the coating 30. Among adhesive materials that may be used in formulating the spandrel in accordance with the invention include aqueous dispersions of modified vinyl acetate polymers.

As previously mentioned, the adhesive 31 serves to tightly bond an insulating mat 32 to the filmed glass. The insulation 32 preferably comprises a fibrous material or a foamed resin composition, for example, fiber glass, builders' felt, asbestos fibers, urethane foam, or the like.

Figure 3:
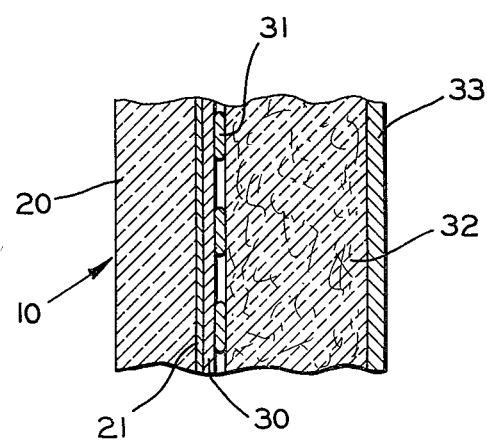
FIG. 3 is a sectional view of a spandrel in accordance with the invention.

It is often desirable that the interior surface of the insulating material be faced with a stiff, hard composition to enable more convenient handling, provide a surface that may be painted or otherwise decorated, or to provide a vapor barrier construction. Such a layer is indicated at 33 in FIG. 3 of the drawings and may comprise a thin piece of fiberboard, pressed wood, metal foil, gypsum board, or the like.

The present invention may be more fully understood from the following example. This example describes a preferred embodiment which is aesthetically pleasing, durable, and highly efficient as an architectural spandrel.

EXAMPLE

A piece of commercial, clear float glass 24 inches by 36 inches and of nominal 0.25 inch thickness is heat strengthened by heating the sheet to a temperature of 1250° F. and then cooling to room temperature at a sufficient rate to impart some temper to the glass.

The heat strengthened glass sheet is then provided with a thin film on one major surface thereof by vacuum evaporating chromium thereon to provide a product having the following characteristics when viewed toward the unfilmed surface:

| | |
|---|---|
| Luminous or visible reflectance | 27 Percent |
| Total solar energy reflectance | 19 Percent |
| Total solar energy transmittance | 20 Percent |
| Illuminant C transmittance | 20 Percent |

The filmed sheet exhibits a silver color in reflectance and is substantially neutral in transmittance.

A black opaque coating is applied completely over the filmed surface of the glass sheet. The coating includes a paint which comprises, by weight, 6.2 percent pigments, of which 75 percent is carbon black (furnace black) and 25 percent is calcium carbonate; and 93.8 percent vehicle composed of 58.9 percent mineral spirits and dryers and 41.1 percent alkyd resin. To this paint is added 3 percent by volume of "Silane A-1100" a gamma-aminopropyltriethoxysilane sold by Union Carbide Chemical Co. The coating is applied to a thickness of 1 mil. After approximately 30 minutes, the coating had dried to a tacky consistency and could be handled. The Illuminant C glass side diffuse reflectance value for this coated sheet is 0.13 percent.

An adhesive composition is applied to the free surface of the opaque coating at spaced points thereabout such that approximately 20 percent of the opaque coating is covered by adhesive. The adhesive is composed of a modified polyvinyl acetate in water dispersion form, and more particularly is sold under the designation "Polybond PA-451" by Polymer Industries Inc. of Stamford, Connecticut.

A 1-inch slab of insulating material composed of 6 pound density fiber glass board is applied to the adhesive and the latter allowed to dry to form a tight bond therebetween. Visual inspection of the resulting spandrel unit was made under a variety of outdoor lighting conditions including bright, full sunlight with sharply defined shadows, sunlight with haze and poorly defined shadows, bright sunlight with clouds and indistinct shadows, and cloudy sky with no apparent sun and no shadows. Under all these conditions, in no instance did the adhesive used to affix the insulation to the coated glass sheet show through the optical film and opaque coating and no haze was apparent when viewing same. When positioned next to a glass sheet provided with the same optical coating as the spandrel but no other layers, i.e., a vision panel, the spandrel matched or harmonized very well therewith so that, to the human eye, the two panels appeared uniform in color.

It will be understood from this disclosure and from the claims that the present invention is not limited to the particular materials nor to the particular embodiment now preferred and described here to illustrate the invention. Accordingly, the present invention embraces equal embodiments which will become apparent to those skilled in the art from this disclosure and which are embraced by the following claims.

I claim:

1. An architectural panel consisting essentially of a transparent substrate, a transparent reflective coating disposed on a major surface of said substrate, a black opaque coating disposed over said transparent coating and including a light absorbing component dispersed therein in an amount sufficient to limit the Illuminant C diffuse reflectance of the panel when viewed from the uncoated surface of the substrate to not more than 0.3 percent, an adhesive applied to said opaque coating, and a layer of insulating material adhered to said adhesive.

2. An architectural panel as claimed in claim 1, wherein said light absorbing component is carbon black.

3. An architectural panel as claimed in claim 1, wherein said panel has an Illuminant C diffuse reflectance less than 0.15 percent when viewed from the uncoated surface of the substrate.

4. An architectural panel as claimed in claim 1, wherein said panel has an Illuminant C diffuse reflectance in the range of 0.05 to 0.2 percent when viewed from the uncoated surface of the substrate.

5. An architectural panel as claimed in claim 1, wherein said black opaque coating is a gloss alkyd based lacquer.

6. An architectural panel as claimed in claim 1, wherein said black opaque coating has a thickness in the range of from 0.1 mil to 5 mils.

7. An architectural panel as claimed in claim 1, wherein said substrate is heat strengthened glass.

8. An architectural panel consisting essentially of a heat strengthened transparent glass substrate, a transparent reflective coating disposed on a major surface of said substrate, a black opaque coating disposed over said transparent coating and substantially coextensive therewith, said opaque coating having carbon black particles dispersed therein in an amount sufficient to limit the Illuminant C glass side diffuse reflectance of the panel to not more than 0.15 percent, an adhesive applied to the exposed surface of said opaque coating, and a layer of insulating material adhered to said adhesive.

9. An architectural panel as claimed in claim 8, wherein said layer of insulating material includes a hard facing board forming the exposed surface thereof.

* * * * *